United States Patent [19]

Gerson et al.

[11] Patent Number: 5,393,339
[45] Date of Patent: Feb. 28, 1995

[54] PREPARATION OF PHTHALOCYANINE PIGMENTS

[75] Inventors: Herman Gerson, New York, N.Y.; Abdul Sattar, Mt. Pleasant, S.C.

[73] Assignee: Miles Inc., Pittsburgh, Pa.

[21] Appl. No.: 241,090

[22] Filed: May 11, 1994

[51] Int. Cl.[6] .......................................... C09B 67/50
[52] U.S. Cl. .................... 106/410; 106/411; 540/144
[58] Field of Search ................ 106/410, 411; 540/144

[56] References Cited

U.S. PATENT DOCUMENTS

| | | | |
|---|---|---|---|
| 2,549,842 | 4/1951 | Moser | 106/411 |
| 2,824,107 | 2/1958 | Newton et al. | 540/137 |
| 2,910,482 | 10/1959 | Gottlieb | 540/136 |
| 3,041,192 | 6/1962 | Brouillard et al. | 106/413 |
| 3,057,872 | 10/1962 | West | 540/129 |
| 3,300,512 | 1/1967 | Gerson et al. | 540/136 |
| 3,615,805 | 10/1971 | Ehrich | 106/413 |
| 4,785,091 | 11/1988 | Fujita et al. | 540/144 |

FOREIGN PATENT DOCUMENTS

| | | |
|---|---|---|
| 1037722 | 12/1989 | China . |
| 58888 | 9/1982 | European Pat. Off. . |
| 2664898 | 1/1992 | France . |
| 57-141453 | 9/1982 | Japan . |
| 57-145156 | 9/1982 | Japan . |
| 57-149358 | 9/1982 | Japan . |
| 57-151654 | 9/1982 | Japan . |
| 58-021452 | 2/1983 | Japan . |
| 3161489 | 7/1991 | Japan . |
| 1533354 | 11/1978 | United Kingdom . |

OTHER PUBLICATIONS

Chemical Abstract 99(10):72190d (Month Unavailable) (1983) of JP58021452A2.
Chemical Abstract 211661n Czech. CS 202,609 (Month Unavailable) vol. 100-1983.
The Merck Index 10th edition (Month Unavailable)(-Merck & Co., Inc. Rahway, N.J. 1983).

Primary Examiner—Mark L. Bell
Assistant Examiner—Scott L. Hertzog
Attorney, Agent, or Firm—Joseph C. Gil; Richard E. L. Henderson

[57] ABSTRACT

This invention relates to an improved process for preparing metal phthalocyanine pigments comprising
(a) heating at a temperature of about 150° C. to about 200° C. a mixture comprising
  (i) a phthalocyanine-forming material based on phthalic acid,
  (ii) at least about 25 mole percent, relative to the phthalocyanine-forming material (i), of a metal donor,
  (iii) at least about 100 mole percent, relative to the phthalocyanine-forming material (i), of a nitrogen donor,
  (iv) 1 to about 20 percent by weight, relative to the phthalocyanine-forming material (i), of a catalyst, and
  (v) about 250 to about 400 percent by weight, relative to the phthalocyanine-forming material (i), of a di($C_1$-$C_3$ alkyl) phthalate solvent; and
(b) isolating the metal phthalocyanine pigment.

18 Claims, No Drawings

PREPARATION OF PHTHALOCYANINE PIGMENTS

BACKGROUND OF THE INVENTION

This invention relates to an improved process for preparing metal phthalocyanine pigments, particularly copper phthalocyanines, in which certain dialkyl phthalate esters are used as the reaction solvent.

The preparation of metal phthalocyanine pigments is known. In a typical preparation, a phthalocyanine-forming material based on phthalic acid, such as phthalic anhydride or a derivative thereof, is heated with a metal donor, a nitrogen donor, and an optional catalyst, preferably in an organic solvent. Many different solvents have been described for use in the preferred solvent processes. For example, U.S. Pat. No. 2,549,842 discloses aromatic hydrocarbons and halogenated derivatives thereof, as well as mixtures of such solvents with aliphatic diluents such as kerosene or chlorinated kerosene derivatives; U.S. Pat. No. 2,824,107 discloses inert organic solvents such as trichlorobenzene, chlorobenzene, naphthalene and chlorinated derivatives thereof, quinoline, benzophenone, and nitrobenzene; U.S. Pat. No. 2,910,482 discloses nitrobenzene, o-nitrotoluene, trichlorobenzene, o-dichlorobenzene, and kerosene; U.S. Pat. No. 3,057,872 discloses trichlorobenzene and kerosene; U.S. Pat. No. 3,300,512 discloses inert high boiling organic solvents such as nitrobenzene, trichlorobenzene, o-dichlorobenzene, kerosene, and naphthalene; U.S. Pat. No. 3,615,805 discloses kerosene; U.S. Pat. No. 4,785,091 discloses hydrophilic solvents, such as sulfolane, 2-methylsulfolane, 3-methylsulfolane, 2,4-dimethylsulfolane, dimethylsulfoxide, N-methylpyrrolidone, and 1,3-dimethyl-2-imidazolidinone; French Patent 2,664,898 discloses inert chlorinated aromatic solvents, such as dichlorotoluene isomers; Japanese Patent 82/141,453 discloses 2-ethylhexyl benzene; Japanese Patent 82/145,156 discloses dimethylethylbenzene (used under pressure); Japanese Patent 82/149,358 discloses alkylbenzenes, including tert-hexylbenzene; Japanese Patent 82/151,654 discloses inert organic solvents, such as amyl alcohol, dichlorobenzene, trichlorobenzene, nitrobenzene, and chloronaphthalene; Japanese Patent 83/21,452 discloses dichlorotoluene and chloroxylene; Japanese Patent 84/89,361 discloses tert-hexylbenzene; Japanese Patent 91/161,489 discloses tert-amylbenzene; and Chinese Patent 1,037,722 discloses bicyclohexyl.

Certain ester solvents have also been reported. For example, Czech. Patent 202,609 discloses methyl 4-methylbenzoate, optionally in admixture with methyl or ethyl benzoate and Japanese Patent 77/10,326 discloses lower alkyl benzoates.

Each of the previously reported solvents, however, is attended by one or more disadvantages, including toxicity, environmental risk, inadequate availability, high cost, processing difficulties (e.g., because of need for large volumes, high pressures, difficult recovery for recycling or disposal, and the like), and low product yields.

It has now been found that these and other difficulties can be avoided or minimized by the use of a di($C_1$–$C_3$ alkyl) phthalate as the reaction solvent in the preparation of metal phthalocyanine pigments. For example, dimethyl phthalate, the preferred solvent of the invention, is relatively inexpensive, need not be used in large volumes, and provides excellent yields of pure metal phthalocyanine pigments. Moreover, dimethyl phthalate is not irritating to or absorbed through the skin and is only moderately toxic when ingested. E.g., *The Merck Index*, 10th edition (Merck & Co., Inc., Rahway, N.J., 1983) at page 474. Although dialkyl phthalates have been used as conditioning solvents for phthalocyanines that have already been formed chemically but not yet converted into pigmentary form (e.g., U.S. Pat. No. 3,041,192 and European Patent Application 58,888), dialkyl phthalates have not previously been disclosed as suitable reaction solvents for the phthalocyanine-forming step.

SUMMARY OF THE INVENTION

This invention relates to an improved process for preparing metal phthalocyanine pigments comprising
 (a) heating at a temperature of about 150° C. to about 200° C. (preferably 160° C. to 190° C.) a mixture comprising
   (i) a phthalocyanine-forming material based on phthalic acid (preferably phthalic anhydride or mono-, di-, tri-, and/or tetrahalogen derivatives thereof),
   (ii) at least about 25 mole percent (preferably 25 to 40 and more preferably 25 to 30 mole percent), relative to the phthalocyanine-forming material (i), of a metal donor (preferably a copper(I) salt),
   (iii) at least about 100 mole percent (preferably 100 to 700 and more preferably 400 to 500 mole percent), relative to the phthalocyanine-forming material (i), of a nitrogen donor,
   (iv) about 1 to about 20 percent by weight (preferably 4 to 10 percent by weight), relative to the phthalocyanine-forming material (i), of a catalyst, and
   (v) about 250 to about 400 percent by weight (preferably 250 to 300 percent by weight), relative to the phthalocyanine-forming material (i), of a di($C_1$–$C_3$ alkyl) phthalate solvent; and
 (b) isolating the metal phthalocyanine pigment.

DETAILED DESCRIPTION OF THE INVENTION

Although the present invention relates generally to metal phthalocyanine pigments, the most preferred metal phthalocyanine pigments are copper phthalocyanines. However, other metal-containing phthalocyanine pigments, such as those based on zinc, cobalt, iron, nickel, and other such metals, may also be used. Furthermore, the preferred phthalocyanine pigments of the present invention can be partially substituted (for example, with chlorine, alkyl, sulfonate, or other substituents typical of phthalocyanine pigments) or unsubstituted.

The pigments prepared according to the present invention are formed as alpha-phase or beta-phase metal phthalocyanines. The term "alpha-phase" or "beta-phase" (also known as the alpha- or beta-crystal form or modification) refers to the crystalline forms in which the metal phthalocyanines can exist. For example, the two major crystal forms for copper phthalocyanines having commercial importance are the alpha crystal form, which has a reddish blue color, and the beta crystal form, which has a greenish blue color. The X-ray diffraction spectra of these two forms are readily distinguishable. In general, for example, the unsubstituted copper phthalocyanines prepared according to the invention are beta-phase pigments, whereas the chlorine-substituted copper phthalocyanines prepared according to the invention are alpha-phase pigments.

Step (a) of the process of the invention form the metal phthalocyanine pigment by reaction of a heated mixture of a phthalocyanine-forming material based on phthalic acid, a metal donor, a nitrogen donor, and an optional catalyst in a di($C_1$–$C_3$ alkyl) phthalate as solvent.

Suitable phthalocyanine-forming materials (i) based on phthalic acid include phthalic acid and salts thereof (preferably alkali metal salts), phthalic anhydride, monoalkyl phthalates, phthalimide, phthalic acid monoamides and salts thereof (preferably alkali metal salts), phthalic acid diamides, o-cyanobenzamides, and other such compounds known in the art. Suitable phthalocyanine-forming material based on phthalic acid also include the corresponding mono-, di-, tri-, and tetrahalogen derivatives (particularly mono-, di-, tri-, and tetrachlorophthalic acid, mono-, di-, tri-, and tetrabromophthalic acid and derivatives thereof), as well as the corresponding alkoxy, sulfonic acid, lower alkyl, nitrile, aryl (especially phenyl), and nitro derivatives. Preferred phthalocyanine-forming materials include phthalic anhydride and the corresponding monohalogen and tetrahalogen derivatives. When using monoalkyl phthalates or dialkyl phthalates as reactants, the specific alkyl group is not critical, but it is generally preferred to use the same $C_1$–$C_3$ alkyl group as present in the dialkyl phthalate solvent.

Suitable metal donors (ii) include polyvalent metals, particularly transition metals such as copper, nickel, iron, cobalt, and the like, either as the free metals or as oxides or salts thereof. When using a free metal, the phthalocyanine-forming reaction is preferably carded out in the presence of an oxidizing agent. Examples of suitable salts include halides, nitrates, phosphates, borates, sulfates, and the like. When preparing the preferred copper phthalocyanines, the metal donor is preferably a copper salt such as copper(I) chloride, copper(I) cyanide, copper(II) nitrate, copper(II) sulfate, or copper(II) phosphate. Although sufficient metal donor must be used to introduce one metal atom into each phthalocyanine pigment molecule, the exact quantity of metal donor is otherwise not critical. However, it is generally preferred to use about 25 to about 40 mole percent (more preferably 25 to 30 mole percent), relative to the phthalocyanine-forming material (i), of the metal donor.

Suitable nitrogen donors (iii) are compounds known in the art that provide the ring nitrogen atoms of the phthalocyanines. Examples of suitable nitrogen donors include urea and derivatives thereof (such as biuret, guanidine, guanylurea, dicyandiamide, and cyanuric acid), sulfonamides (such as toluenesulfonamide), and the like. Although a sufficient amount of nitrogen donor must be used to introduce four ring nitrogen atoms into each phthalocyanine pigment molecule, the exact quantity of nitrogen is otherwise not critical. However, the quantity of nitrogen donor relative to the phthalocyanine-forming material based on phthalic acid typically varies from about 100 to about 700 percent by weight or even more, although it is generally preferred to use a ratio of 200 to 500 percent by weight.

Suitable catalysts (iv) for step (a) are compounds known in the art that promote the formation of the phthalocyanine structure. Preferred catalysts include various transition metal compounds containing a metal of Group IV, V, or VI of the periodic table. Examples of suitable catalysts include various titanium compounds, such as titanium tetrachloride, titanium sulfate, and various known organic titanates; zirconium salts, such as zirconium tetrachloride; molybdate salts, such as ammonium molybdate; and boric acid and salts thereof. It is also possible, although generally less preferred, to use more complex transition metal compounds such as ammonium borotungstate, ammonium phosphomolybdate, phosphotungstomolybdic acid, and the like. Although it is possible in theory to carry out the reaction in the absence of catalyst, catalysts are generally necessary. The amount of such catalysts ranges from about 1 to about 20 percent by weight relative to component (i), although 4 to 10 percent by weight is preferred.

Suitable solvents (v) for step (a) are dialkyl esters of phthalic acid in which the alkyl groups can be methyl, ethyl, propyl, and isopropyl groups. Although it is possible to used mixed esters having two different alkyl groups, it is preferred to use esters having only one alkyl group. A particularly preferred ester is dimethyl phthalate. Although the amount of solvent can vary over a large range, it is generally preferred to use about 250 to about 400 percent by weight (more preferably 250 to 300 percent by weight), relative to the phthalocyanine-forming material (i), of solvent.

Step (a) of the process of the invention can be carried out over a wide temperature range, generally ranging from about 30° C. to 200° C. To avoid undesirable side reactions, it is generally necessary to initiate the reaction by heating the reaction mixture to a temperature of about 150° C. to about 160° C., typically over a period of about three to about seven hours (although faster heating is also suitable), then to hold the temperature at about 150° C. to about 200° C. (preferably 160° C. to 190° C.) for a period of about four to about eight hours (more preferably about 6 hours).

Isolation step (b) can be carried out by any of several methods known in the art. Preferred methods involve precipitation of the pigment from the cooled reaction mixture, followed by removal of residual reaction solvent. For example, the pigment can be precipitated by pouring the cooled reaction mixture into water or by pouring water into the cooled reaction mixture. The temperature to which the reaction mixture is cooled, although generally not critical, should be sufficiently high to prevent undesirably high viscosity but not so high that the water boils violently during addition. Temperatures of between 50° C. and 95° C. are generally suitable, although temperatures of between 80° C. and 90° C. are preferred. In a preferred embodiment, the water contains a base, preferably a strong base such as an alkali metal hydroxide.

After the pigment is precipitated, the reaction solvent is preferably removed. Although it is possible in theory to remove phthalate ester solvents by physical separation methods, it has been found difficult in practice to remove all (or essentially all) of the solvent by purely physical means. Consequently, it has been found particularly advantageous to hydrolyze the phthalate ester and remove the hydrolysis by-products (as well as any other base-soluble impurities) before the pigment is collected. Hydrolysis can be carried out, for example, by heating the solvent-containing reaction mixture in a strongly alkaline aqueous solution such as aqueous sodium or potassium hydroxide. A particularly preferred hydrolysis method involves heating the reaction mixture in about 5 to about 25% aqueous sodium hydroxide (prepared, for example, by adding 50% aqueous sodium hydroxide directly to the aqueous reaction mixture) at about 80° C. to about 90° C. for about two to about four hours. Other hydrolysis methods known in the art would, of course also be suitable. The phthalate and alcohol by-products formed during hydrolysis can then be removed, for example, during the separation step. Although not an essential step, it is often desirable to form an acidic slurry, followed by filtration, to remove (and recover if desired) any acid-soluble impurities, such as excess metal, that may be present.

It is also possible to isolate the pigment by treating the reaction mixture with concentrated sulfuric acid (typically at temperatures of about 50° C. to about 90° C.), adding water, heating, filtering, and neutralizing with an alkali. E.g., U.S. Pat. No. 2,602,800.

The phthalocyanine pigment can be collected by methods known in the art, preferably filtration, and then dried. Other collection methods known in the art, such as centrifugation, are suitable but generally less preferred. When the pigment is collected by filtration, the hydrolysis by-products can easily be removed when the pigment filter cake is washed, preferably with water. Although generally less preferred, it is also possible to collect the pigment without first removing the phthalate and/or alcohol by-products or after concomitant chemical precipitation of the phthalate and/or alcohol. For example, a metal phthalate salt can often provide advantageous surface properties that enhance pigmentary properties.

Phthalocyanines as initially isolated in the process of the present invention, often referred to as crude phthalocyanines, are generally unsuitable for use as pigments and must be subjected to one or more additional finishing steps that modify particle size, particle shape, and/or crystal structure in such a way that provides good pigmentary quality. See, for example, K. Merkle and H. Schäfer, "Surface Treatment of Organic Pigments" in *Pigment Handbooks,* Vol. III (New York: John Wiley & Sons, Inc., 1973), page 157; R. B. McKay, "The Development of Organic Pigments with Particular Reference to Physical Form and Consequent Behavior in Use" in *Rev. Profl. Coloration,* 10, 25–32 (1979); and R. B. McKay, "Control of the application performance of classical organic pigments" in *JOCCA.,* 89–93 (1989). Although many suitable conditioning methods are known to those skilled in the art, the most commonly used methods involve dissolving or suspending the crude pigment in strong mineral acids, followed by precipitation, and/or milling the crude pigment.

Conditioning with a strong acid involves treating the crude pigment with aqueous mineral acid (preferably sulfuric acid) in a process known as "acid pasting" (in which an acidic solution containing protonated pigment is formed) or "acid swelling" (in which a suspension of protonated pigment is formed). A sufficient amount of mineral acid, preferably concentrated acid, is added to insure formation of an acidic solution or suspension within a reasonable amount of time. However, except for the requirement that the solution or suspension be acidic, the amount and concentration of acid is generally not critical. For example, more dilute acid may be used if the stirring time is extended, but use of the more concentrated acids is preferred for commercial applications. Suitable mineral acids include sulfuric acid and polyphosphoric acid, with sulfuric acid being preferred. It is particularly preferred to use at least 64% aqueous sulfuric acid in amounts of about 4 to about 15 parts by weight of acid relative to the quantity of pigment. Although the dissolution rate of crude pigment in acid can be increased by warming the mixture (for example, to about 50° C.), it is generally preferred to dissolve the crude pigment in acid at or below 35° C. to minimize sulfonation (when using sulfuric acid) or degradation of the phthalocyanine.

After the acid treatment is completed, the pigment is precipitated by adding the strongly acidic solution to a liquid in which the pigments are completely or almost completely insoluble, preferably water or methanol or other lower aliphatic alcohols (such as ethanol, propanol, or butanol), as well as mixtures thereof. The precipitated pigment is then collected by methods known in the art, preferably filtration followed by washing to remove residual acid. Other collection methods known in the art, such as centrifugation, are suitable but generally less preferred. The acid-pasted or acid-swelled pigment is then dried for use or for further conditioning, for example, by milling.

Suitable milling methods include dry-milling methods, such as sand-milling, ball-milling, and the like, and wet-milling methods, such as salt-kneading, bead-milling, and the like in water or organic liquids. Milling can be carried out using additives such as inorganic salts (especially for dry milling) and surfactants or dispersants, particularly various known sulfonamide, carboxamide, and aminoalkyl derivatives of phthalocyanines (especially for wet milling). Suitable milling liquids for wet milling include organic liquids, such as alcohols, esters, ketones, and aliphatic or aromatic hydrocarbons and derivatives thereof, and inorganic liquids, such as water.

Crude phthalocyanines are preferably dried and then milled, most commonly in the presence of an inorganic salt that is subsequently removed by washing. Pigmentary phthalocyanines can also be obtained by premilling the dried crude material and then treating the milled material with an organic liquid. Other methods use a premilling step followed by another milling step using water and small amounts of an organic liquid.

Pigmentary phthalocyanines can also, less preferably, be obtained without milling by heat treatment of crude presscake in large quantities of a conditioning liquid.

It is possible, although generally not preferred, to carry out the conditioning step before removal of the di($C_1$–$C_3$ alkyl) phthalate reaction solvent. This variant is particularly useful when the same dialkyl phthalate is used as the conditioning liquid. When conditioning is complete, the residual phthalate ester can be removed as described above. It is also possible, although generally less preferred, to leave small amounts of the phthalate ester solvent on the pigment surface. E.g., U.S. Pat. Nos. 2,900,390, 3,041,192, and 4,077,972.

Because of their light stability and migration properties, the metal phthalocyanine pigments prepared according to the present invention are suitable for many different pigment applications. For example, pigments prepared according to the invention can be used as the colorant (or as one of two or more colorants) for very lightfast pigmented systems. Examples include pigmented mixtures with other materials, pigment formulations, paints, printing ink, colored paper, or colored macromolecular materials. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with the metal phthalocyanine pigments of the present invention can have any desired shape or form.

The pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Examples 1-2 Preparation of Copper Phthalocyanine

Copper phthalocyanine was prepared using dimethyl phthalate (Example 1 according to the invention) and trichlorobenzene (comparison Example 2) as solvent.

Example 1

To 300 g of dimethyl phthalate was added with stirring 100 g of phthalic anhydride, 200 g of urea, 20 g of copper(I) chloride, and 8 g of ammonium molybdate. The mixture was heated up to 185° C. over a period of about three hours and then maintained at that temperature for another six hours and then allowed to cool to 90° C. The cooled mixture was added to 300 g of water containing 120 g of 50% sodium hydroxide. The dimethyl phthalate was hydrolyzed by stirring the alkaline mixture at 85° C. for two hours, after which the mixture was poured with agitation into 2500 g of water and stirred at 85° C. for an additional two hours. The pigment was collected by filtration and washed with hot water until free of alkali. The alkali-free pigment was then reslurried in 2500 g of water containing 150 g of concentrated hydrochloric acid and heated with agitation at 75° C. for two hours. The copper phthalocyanine pigment was collected by filtration, washed with hot water until free of acid, and dried at 80° C., providing a yield of 100% (based on the phthalic anhydride starting material) and a purity of about 100%

Example 2 (Comparison)

The procedure of Example 1 was repeated using 600 g of trichlorobenzene as solvent instead of dimethyl phthalate. The trichlorobenzene was removed by filtration and drying in vacuo. This pigment exhibited essentially the same color properties as the pigment of Example 1. However, the pigment of Example 2 was obtained in a yield of only 85-95% and at a purity of about 95%.

Examples 3-4 Preparation of Monochloro Copper Phthalocyanine

Monochloro copper phthalocyanine was prepared using dimethyl phthalate (Example 3 according to the invention) and trichlorobenzene (comparison Example 4) as solvent.

Example 3

To a stirred mixture of 23 g of sulfolane and 23 g of titanium tetrachloride heated at 100° C. was added 400 g of dimethyl phthalate. To this mixture was then added 100 g of phthalic anhydride, 71 g of the monosodium salt of 4-chlorophthalic acid, 270 g of urea, and 25 g of copper(I) chloride. The mixture was heated at 150° C. for one hour, then at 170° C. for three hours, and finally at 190° C. for eight hours. The mixture was then allowed to cool to 80° C. To this mixture was added 360 g of water containing 180 g of 50% sodium hydroxide. The dimethyl phthalate was hydrolyzed by stirring the alkaline mixture at 85° C. for one hour, after which the mixture was poured with agitation into 3000 g of water and stirred at 85° C. for an additional two hours. The pigment was collected by filtration and washed with hot water until free of alkali. The alkali-free pigment was then reslurried in 3000 g of water containing 180 g of concentrated hydrochloric acid and heated with agitation at 80° C. for two hours. The monochloro copper phthalocyanine pigment was collected by filtration, washed with hot water until free of acid, and dried at 80° C., providing a yield of 100% and a purity of 100%.

Comparable results could be obtained by omitting the sulfolane and adding the titanium tetrachloride directly to the dimethyl phthalate.

Example 4 (Comparison)

The procedure of Example 3 was repeated using 600 g of trichlorobenzene as solvent instead of dimethyl phthalate. The trichlorobenzene was removed by filtration and drying in vacuo. This pigment exhibited essentially the same color properties as the pigment of Example 3. However, the pigment of Example 4 was obtained in a yield of only 85-95% and at a purity of only 96-98%

Examples 5-6 Preparation of Tetrachloro Copper Phthalocyanine

Tetrachloro copper phthalocyanine was prepared using dimethyl phthalate (Example 5 according to the invention) and trichlorobenzene (comparison Example 6) as solvent.

Example 5

To a stirred mixture of 15 g of sulfolane and 10 g of titanium tetrachloride was added 200 g of dimethyl phthalate, followed by 100 g of the monosodium salt of 4-chlorophthalic acid and 31 g of 20% oleum (i.e., concentrated sulfuric acid containing 20% SO$_3$). The mixture was heated at 70° C. for thirty minutes, after which 150 g of urea and 9.5 g of copper(I) chloride were added. The mixture was then heated at 150° C. for one hour, then at 170° C. for one hour, and finally at 193° C. for eight hours. The mixture was then allowed to cool to 80° C. To this mixture was added 450 g of water containing 120 g of 50% sodium hydroxide. The dimethyl phthalate was hydrolyzed by stirring the alkaline mixture at 85° C. for one hour, after which the mixture was poured with agitation into 2300 g of water and stirred at 80° C. for an additional two hours. The pigment was collected by filtration and washed with hot water until free of alkali. The alkali-free pigment was then reslurried in 2300 g of water containing 140 g of concentrated hydrochloric acid and heated with agitation at 70° C. for one hour. The tetrachloro copper phthalocyanine pigment was collected by filtration, washed with hot water until free of acid, and dried at 80° C., providing a yield of 100% and a purity of 95–97%.

Comparable results could be obtained by omitting the sulfolane and adding the titanium tetrachloride directly to the dimethyl phthalate.

Example 6 (Comparison)

The procedure of Example 3, Part A, of U.S. Pat. No. 3,300,512 was repeated. This tetrachloro copper phthalocyanine pigment exhibited essentially the same color properties as the pigment of Example 5. However, the pigment of Example 6 was obtained in a yield of only 80–85% and at a purity of only 95%.

Examples 7–8 Preparation of Hexadecachloro Copper Phthalocyanine

Hexadecachloro copper phthalocyanine was prepared using dimethyl phthalate (Example 7 according to the invention) and trichlorobenzene (comparison Example 8) as solvent.

Example 7

To 310 g of dimethyl phthalate was added with stirring 100 g of tetrachlorophthalic anhydride, 110 g of urea, 10 g of titanium tetrachloride, and 10 g of copper(I) chloride. The procedure of Example 1 was repeated in all other respects, thereby providing hexadecachloro copper phthalocyanine in a yield of 85% and a purity of 95–98%.

Example 8 (Comparison)

The procedure of Example 1 of U.S. Pat. No. 2,549,842 was repeated. The hexadecachloro copper phthalocyanine pigment was obtained in a yield of ca. 85% and at a purity of 95–98%.

Example 9 (Comparison)

The method of Example 1 was attempted using 300 g of methyl benzoate instead of dimethyl phthalate. The resultant viscous reaction mass gave a product having poor pigmentary properties in a yield of only about 50%.

What is claimed is:

1. A process for preparing a metal phthalocyanine pigment comprising
    (a) heating at a temperature of 150° C. to 200° C. a mixture comprising
        (i) a phthalocyanine-forming material based on phthalic acid,
        (ii) at least 25 mole percent, relative to the phthalocyanine-forming material (i), of a metal donor,
        (iii) at least 100 mole percent, relative to the phthalocyanine-forming material (i), of a nitrogen donor,
        (iv) 1 to 20 percent by weight, relative to the phthalocyanine-forming material (i), of a catalyst, and
        (v) 250 to 400 percent by weight, relative to the phthalocyanine-forming material (i), of a di(C$_1$–C$_3$ alkyl) phthalate solvent; and
    (b) isolating the metal phthalocyanine pigment.

2. A process according to claim 1 wherein the phthalocyanine-forming material based on phthalic acid is phthalic anhydride or a mono-, di-, tri-, and/or tetrahalogen derivative thereof.

3. A process according to claim 1 wherein the metal donor is a copper(I) salt.

4. A process according to claim 1 wherein the metal donor is copper(I) chloride, copper(I) cyanide, copper(II) nitrate, copper(II) sulfate, or copper(II) phosphate.

5. A process according to claim 1 wherein 25 to 40 mole percent, relative to the phthalocyanine-forming material (i), of the metal donor is used.

6. A process according to claim 1 wherein the nitrogen donor is urea.

7. A process according to claim 1 wherein 100 to 700 mole percent, relative to the phthalocyanine-forming material (i), of the nitrogen donor is used.

8. A process according to claim 1 wherein 400 to 500 mole percent, relative to the phthalocyanine-forming material (i), of the nitrogen donor is used.

9. A process according to claim 1 wherein 4 to 10 percent by weight, relative to the phthalocyanine-forming material (i), of a catalyst is used.

10. A process according to claim 1 wherein 250 to 300 percent by weight, relative to the phthalocyanine-forming material (i), of the di(C$_1$–C$_3$ alkyl) phthalate solvent is used.

11. A process according to claim 1 wherein the di(C$_1$–C$_3$ alkyl) phthalate solvent is dimethyl phthalate.

12. A process according to claim 1 wherein the mixture of step (a) is heated at a temperature of 160° C. to 190° C.

13. A process according to claim 1 wherein the metal phthalocyanine pigment is isolated by
    (i) precipitating the metal phthalocyanine pigment by
        (A) cooling the mixture from step (a) is cooled to 80° C. to 90° C., and
        (B) pouring the cooled reaction mixture into water or pouring water into the cooled reaction mixture;
    (ii) hydrolyzing the di(C$_1$–C$_3$ alkyl) phthalate used in step (b); and
    (iii) collecting the metal phthalocyanine pigment.

14. A process according to claim 13, wherein the water used in step (i) contains a strong base.

15. A process according to claim 13 wherein the water used in step (i) contains an alkali metal hydroxide.

16. A process according to claim 13 wherein the di(C$_1$–C$_3$ alkyl) phthalate is hydrolyzed with 5 to 25% aqueous sodium hydroxide heated at 80° C. to 90° C. for two to four hours.

17. A process according to claim 13 wherein the metal phthalocyanine pigment is collected by filtration.

18. A process according to claim 1 additionally comprising (c) conditioning the metal phthalocyanine pigment.

* * * * *